Aug. 25, 1942.  K. A. LINDNER ET AL  2,294,121
CONVEYING MECHANISM
Filed June 20, 1938  2 Sheets-Sheet 1
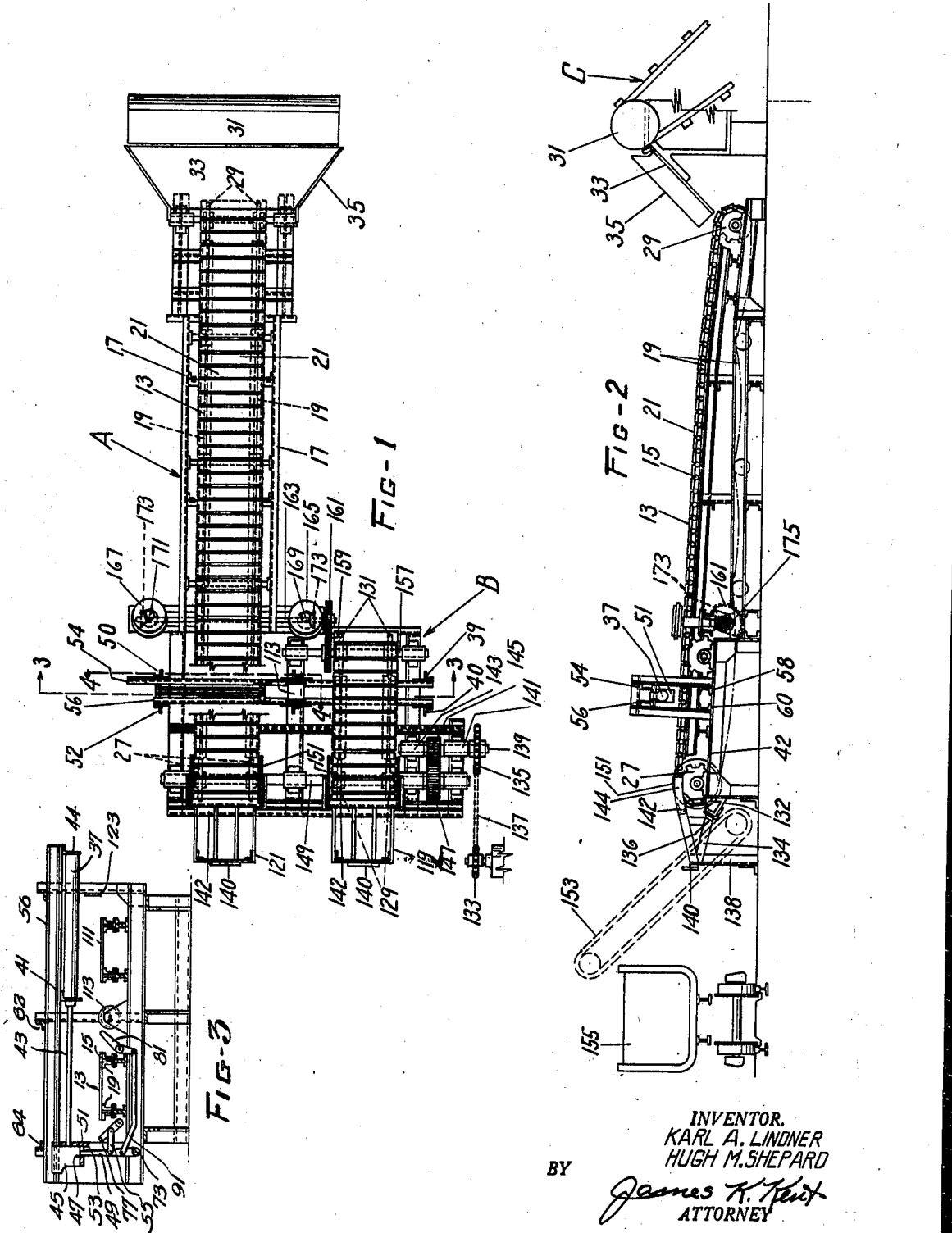
INVENTOR.
KARL A. LINDNER
HUGH M. SHEPARD
BY
ATTORNEY

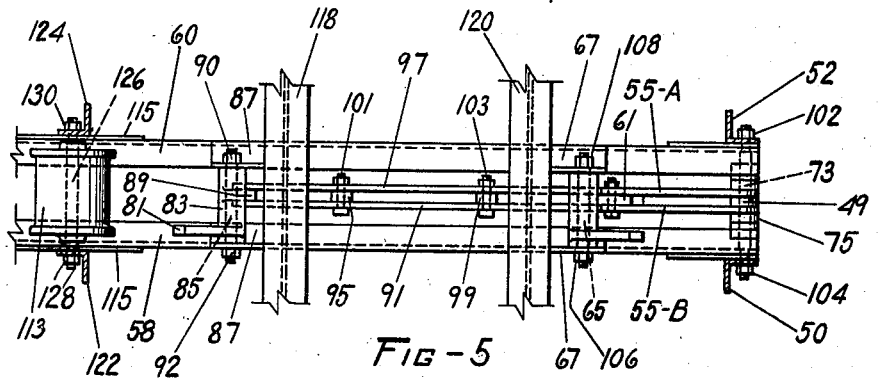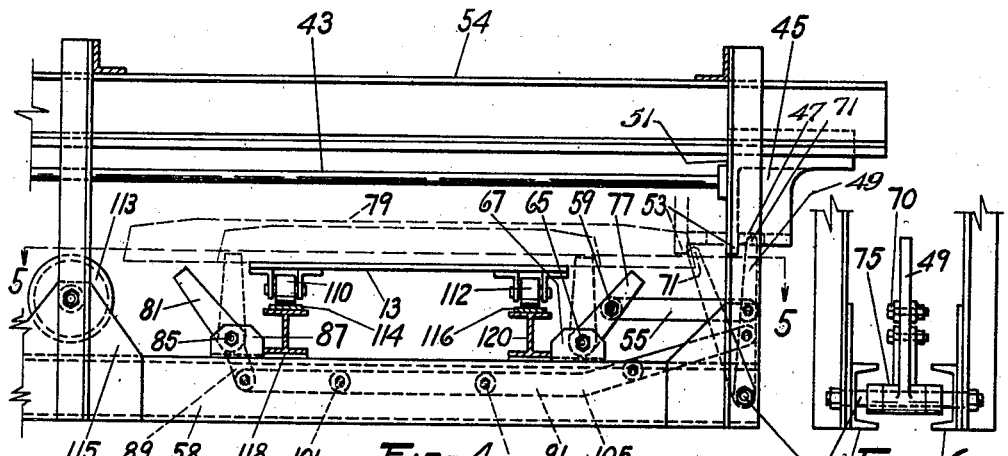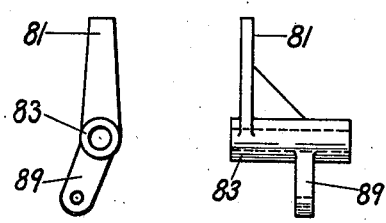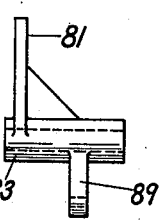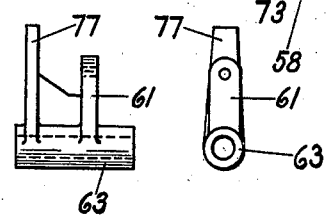

Patented Aug. 25, 1942

2,294,121

UNITED STATES PATENT OFFICE 2,294,121

CONVEYING MECHANISM

Karl A. Lindner, Plainfield, N. J., and Hugh M. Shepard, Baltimore, Md., assignors to American Smelting and Refining Company, New York, N. Y., a corporation of New Jersey Application June 20, 1938, Serial No. 214,628

13 Claims. (Cl. 198—24)

This invention relates broadly to material handling equipment and more particularly to an improved machine for conveying cast metal shapes in position to be inspected including mechanism for sorting and transporting the inspected shapes.

One object of the present invention is to provide a machine for conveying and handling various sizes and shapes of castings, such as copper wire bars, ingots, ingot bars, cakes, and the like.

A further object of the present invention is to provide conveying mechanism which includes parallel table-like conveyors, together with improved mechanism for shifting selected shapes from one conveyor table to the next.

A still further object of the invention is to provide conveying mechanism which includes parallel table-like conveyors, together with improved mechanism for shifting selected shapes from one table to the next while providing instrumentalities for arresting the travel of the said shapes along the conveying mechanism during the shifting operation.

Further objects of the invention will become apparent as the description proceeds, and the features of novelty will be pointed out in particularity in the appended claims.

The invention will be ascertained more readily from a consideration of the accompanying drawings, in which Fig. 1 is a plan view of the conveying mechanism, embodying the improvements of the present invention.

Fig. 2 is a side elevation of the apparatus shown in Fig. 1.

Fig. 3 is a transverse sectional elevation taken on the line 3—3 of Fig. 1, looking in the direction of the arrows.

Fig. 4 is an enlarged transverse sectional elevation taken on the line 4—4 of Fig. 1.

Fig. 5 is a fragmentary sectional plan view of a portion of the apparatus shown in Fig. 4, the view being taken on the line 5—5 of Fig. 4, looking in the direction of the arrows.

Fig. 6 is an end elevation of the construction shown in Fig. 5, taken on the line 6—6 of Fig. 5, looking in the direction of the arrows.

Fig. 7 is a front elevation showing details of construction of the left hand stop member as viewed in Figs. 4 and 5.

Fig. 8 is a side elevation of the element of Fig. 7.

Fig. 9 is a front elevation showing details of construction of the right hand stop member as viewed in Fig. 4.

Fig. 10 is a side elevation of the member shown in Fig. 9.

Referring more particularly to the drawings, it will be seen that the improved apparatus of the present invention comprises a main conveyor A and an auxiliary conveyor B, which is shown as being disposed parallel to the main conveyor A. This main conveyor comprises a suitably driven endless conveying bed 13, which may be, desirably, an apron type of traveling conveyor presenting a continuous smooth surface on its top, carried on the rollers, generally designated 15 in Figure 3. In practice, the endless traveling conveyor 13 is made up of endless chains 19, 19 carrying flights 21, which form a continuous smooth upper surface on which the cast shapes are laid cross-ways of the resulting belt. The endless conveyor bed 13 passes over head and foot sprockets 27 and 29, respectively, which mesh with the chains 19, 19. The conveyor bed and the various supporting and driving instrumentalities therefor are mounted, of course, on suitable framework, the structural details of which may be varied in accordance with the requirements of the particular installation.

The main conveyor A, as shown in Figure 2, may receive the cast shapes from an inclined drag chain conveyor C which removes the shapes from a bosh in which the shapes have been cooled under water. The cooled shapes are discharged from the conveyor C over its head shaft drum 31 into the chute 33 having sides 35 which are adjustable to receive and to guide various lengths of castings onto the conveyor A. Where these castings are wire-bars, they are deposited from the chute 33 cross-ways of the conveyor A, where inspectors gauge the bars, by turning them over and marking them for any defects and finally leaving them in approximate alignment for even discharge for piling.

As the bars proceed towards the head of the conveyor A, those marked for rejection are sorted out from the remainder and are transferred to the parallel conveyor B, which is positioned adjacent to the conveyor A, and which may be mounted on substantially similar supporting instrumentalities.

This transfer or sorting mechanism comprises instrumentalities for stopping the movement of the wire-bars on the endless conveyor bed 13 when a selected bar reaches a predetermined station at which the transfer of the bar from the main conveyor A to the auxiliary conveyor B is to be effected. The mechanism also includes operable means for engaging and shifting the selected bar from one conveyor to the other.

Suitable means for engaging and shifting the bars is illustrated in Figures 3 and 4 and comprises a cylinder 37 having a piston therein to which is attached the piston rod 43. Fluid pressure, such as compressed air, steam or hydraulic fluid, may be used to operate the piston as desired.

The cylinder 37 is mounted at a suitable height above the conveyor beds, there being provided for this purpose the vertical angles 39 and 40 which are secured to a substantially horizontal plate 41 of the frame member of conveyor B. Also at the far side of conveyor A there are mounted similar vertical angle bars 50, 52 so that bars 39 and 50, and 40 and 52 are in planes perpendicular to the conveyors A and B. Channel beam 54 extends between the vertical angle bars 39 and 50 and channel beam 56 extends between the vertical angle bars 40 and 52, the channels 54 and 56 being opposite to each other and having their flanges welded to the respective vertical angle bars near the top of the latter.

Channel beams 58 and 60 also extend between the vertical angle bars 39 and 50, and 40 and 52, respectively, and are welded or otherwise suitably secured to the angle bars, so that the flanges of the channels extend opposite to each other.

Cylinder 37 is suitably supported at one end by an angle member 44, and at the other end by a similar angle member, as shown in Figure 3. The channel beams 54, 56, 58 and 60 are braced by suitable vertical angle bars such as those designated at 62 and 64, which are disposed at suitable intervals along the length of the channels.

As has been mentioned above, the piston rod 43 is operated by the cylinder 37 through the medium of compressed air. On the outer end of the piston rod 43 is secured a piston head member 45 having a portion 51 which comprises a projection or abutment member 53. On the underside of the piston head, a recess 47 is provided for receiving the end of a vertically disposed operating lever 49, which is fulcrumed on a horizontal shaft 73 mounted in the channel members 58 and 60, as illustrated in Figure 6.

This lever 49 is positioned on the far side of the conveyor A as viewed from the auxiliary conveyor B, and the piston head 45 normally maintains the lever 49 in an inoperative position. The abutment portion 53 projects downwardly sufficiently far so that it will engage the end of a selected bar upon retraction of the rod 43 into the cylinder 37. Further retraction of the piston rod 43 causes the extension 53 to slide the bar from the endless conveyor bed 13 of the main conveyor A to the bed 111 of auxiliary conveyor B, as will be described in more detail hereinafter. The piston head 54 is guided by the channels 54 and 56 against lateral movement as the rod 43 is reciprocated in the cylinder 37, the piston head 45 being in lateral engagement with the channels 54 and 56, so that the rod 43 will be retained continuously in proper alignment with the cylinder 37.

When the piston head 45 is actuated to transfer a wire-bar from the conveyor A to the conveyor B, it is evident that since this movement is made transversely of the conveyor, it is necessary to arrest the movement of the bar along the conveyor while the transfer of the wire-bar is being effected; and mechanism is provided for effecting such arrest of the forward movement of the selected wire-bar incident to its transfer.

This mechanism comprises the substantially upright lever 49, which is turnably mounted on axle 73 which is mounted between the channels 58 and 60. The lever 49 is sufficiently long for its end 71, which preferably is rounded, to extend into a recess 47 in the underside of the piston head 45, so that as the piston 45 is moved towards the left, as viewed in Fig. 4, the lever 49 will be rocked towards the left as shown in Fig. 4. The lever 49 is operatively connected to the pivoted arm members 77 and 81 by means of the link means generally designated 55 and 91.

Link 55 comprises a pair of similar arms 55a and 55b which engage opposite sides of the lever 49 and which are connected to the lever by means of a bolt 70.

The arms 55a and 55b, as shown in Figure 5, are bolted in a similar manner by a bolt 59 to a rocker arm 61. This arm preferably is formed integral with a sleeve 63, as illustrated in Figures 9 and 10, which is rotatably mounted on the shaft 65 fixedly supported on the spaced channel members 58 and 60 by the brackets 67. The sleeve 63 also carries arm 77 which extends parallel to and is longer than arm 61. Arm 77 is made long enough, when positioned as shown by the dotted lines in Figure 4, to engage a wire-bar 79 on the conveyor 13, whereas the arm 61 is shortened to clear the said wire-bar.

It will be seen from Figure 4 that the arm 77 engages the selected wire-bar when the piston rod 43 is retracted, and the piston head 45 shifts the lever 49 to the left responsively to the movement of the piston head. This movement swings the arm 77 into abutting relation with the wire-bar 79. Reverse movement takes place when the piston rod 43 is moved in the opposite direction whereby the arms 77 and 81 are swung out of the path of the wire-bar.

The pivoted stop arm member 81 is actuated simultaneously with the arm 77 and coacts therewith to prevent further movement of the wire-bar on the conveyor 13. Preferably the stop arm member 81 is constructed as illustrated in Figures 7 and 8, and comprises a sleeve 83 which may be formed integral therewith. The sleeve 83 is rotatably mounted on a shaft 85 which is supported on the channel members 58 and 60 by spaced bearing brackets 87. Shaft 85 is suitably fastened at its ends to the brackets 87 by means of the nuts 90 and 92, as shown in Figure 5.

The arm 81 is actuated by an operating arm 89 which extends downwardly from the sleeve 83 and which is connected by a system of links to the lever 49. The link system may be made up conveniently of a plurality of sections which are bolted together on suitable spacers, or it may comprise corresponding opposing single long links 91, 97, which are bolted to both sides of the arm 89, and which are spaced apart by suitably spaced washers 95, 99 and held to the washers by bolts 101, 103. Links 91, 97 are bent upwardly as designated at 105 and are conected to the lever 49 at a point located sufficiently above the fulcrum point 73 to obtain the required movement of the links 91, 97 to raise the arm 81 into abutting position against the wire-bar 79 when the lever 49 is swung to the left as viewed in Figure 4. As will be apparent from the drawings, the shaft 73 which is the fulcrum for lever 49, is secured by nuts 102, 104 and axle 65 mounting the arms 61, 67 is secured in position by nuts 106, 108.

The conveyor element 13 of the main conveyor upon which the wire-bars travel, is shown in Figure 4 as being supported on rollers 110, 110 which are shown as traveling on wear plates 114, 116 on the I-beams 118, 120 constituting the upper track for the rollers.

The conveyor element 111 of the auxiliary conveyor B is similarly mounted, the conveyors A and B being spaced apart sufficiently to provide suitable clearance between the conveyors. Intermediate the moving conveyor elements 13 and 111 there is positioned a guide roller 113 which is mounted on a shaft 126 carried in the vertical angle members 122, 124, which are reinforced by plates 115, 115, welded to the channels 58 and 60. The shaft 126 is secured in place by nuts 128, 130.

Therefore, it will be seen that when a selected wire-bar is to be sorted from the remaining bars, as it arrives at the sorting station, fluid pressure in the cylinder 37 is controlled so that the piston rod 43 is retracted into the cylinder 37, thereby moving the piston head 45 to the left as viewed in Fig. 4. This movement rocks the lever 49 to the left, which raises the arms 77 and 81 into impeding position to stop the movement of the wire-bar on the conveyor, and further movement of the piston head to the left engages with the end of the wire-bar so as to push it off from the conveyor 13 onto the conveyor 111 over the roller 113. It will be noted in this connection that the rocker shafts 65 and 85 are sufficiently close together so that the arms 77 and 81 when raised to operative position as illustrated by the dotted lines in Figure 4, will be sufficiently close together to engage any length of wire-bar, and the stroke of piston 43 is sufficient to bring the piston head sufficiently far to the left to transfer any size of bar from the main conveyor A to the auxiliary conveyor B.

When the selected bar has been transferred from conveyor A to conveyor B the piston rod 43 is actuated in the opposite direction, which causes the lever 49 to rock in the opposite direction and retracts the arms 77 and 81 out of the path of the bars on the conveyor, allowing them to discharge. A stop 123 prevents the sorted wire-bars from over-sliding the conveyor 111.

The sorted wire-bars are carried by the conveyor 111 to a discharge platform 119, where they are unloaded from the conveyor, while the remaining bars are carried by the conveyor 13 to the unloading platform 121, onto which they are discharged from the conveyor.

These platforms 119 and 121 are of identical construction and are detachably secured to the conveyor frames, the latter having extensions 132 for the attachment of braces 134 to the conveyor frames, there being at least one of such braces at each side of each frame, suitable securing bolts being provided which pass through flange 136 of the braces 134 and through the angle iron 138 and extension 132. End supports 138 take the weight of the table, an end plate 140 being provided to retain the bars on the table. Also a guide plate 142 is provided for each table in order to guide the bars onto the tables and to prevent the bars from catching under the edge of the table as they discharge from the respective conveyors; and each of the tables is provided with lateral guides 144 which are adapted to engage the top side frames of each conveyor so as properly to center and to align the tables with the respective conveyors.

The wire-bars overhang the apron conveyor 13 and 111, and consequently they overhang the discharge platforms 121 and 119, so that an overend lifting frame can be inserted under both ends of the layer of bars on the discharge platforms, so that several of the bars may be removed at one time. This lifting frame may be of any desirable type, a convenient form being a double goose-neck hook lifting frame suspended from an air cylinder hung from a trolley carried by an overhead job crane.

The conveyors A and B are driven from a common source of power, not shown, operating a driving sprocket 133, which drives a sprocket 135 through a chain 137. The sprocket 135 is mounted on a shaft 139 which passes through bearings 141 and 143 suitably mounted on side members of the conveyor frames. A pinion 145 also is mounted on the shaft 139, the pinion 145 meshing with a gear 147 on head shaft 149, which extends across the frames of both conveyors, and forms a common head shaft for both of these conveyors. The driving sprockets 27 of the conveyor A, as well as the driving sprockets 129 of the auxiliary conveyor, are mounted on this shaft and are operated thereby. The foot sprockets of the conveyor B are designated at 131.

As the apron conveyors are driven around the drive sprockets, it is apparent that a gap is opened up between each of the flights on both conveyors. In order to prevent the edge of these flights from catching on the wire-bars at the discharge platforms 119 and 121, roller discs such as those designated at 151 are mounted on the drive shaft 149, which discs 151 act to raise the advancing wire bars slightly and to deliver them to the discharge table without allowing them to come in contact with the edges of the successive flights where such edges are exposed due to flexing of the conveyors around the drive sprockets.

Obviously where the wire-bars are too short to be handled by the transfer mechanism described above, such as would be the case where the 135 pound bars are being made, which bars are 38 inches long, as against the standard 54 inch length of bars, extension pieces are attached to the piston head 45 and to stop 123 in order to accommodate the shorter length of bar.

The foot sprockets 131 of the conveyor B are mounted on a shaft 157 upon which is mounted a gear 159 which, in turn, meshes with a gear 161 on a shaft 163 which extends through the frame of conveyor A. This shaft 163 drives a pair of guide wheels 165 and 167 which are positioned sufficiently close to the moving conveyor on both sides thereof and in advance of the transfer mechanism to engage the ends of any substantially mis-aligned wire-bars so that the wire-bars will be moved so as to bring the ends accurately in alignment for piling the bars. The wheels 165 and 167 are driven by means of their vertical shafts 169 and 171 each provided with a bevel gear 173, each bevel gear meshing with a gear 175 on the shaft 163 so that the wheels 165 and 167 are continuously rotated while the conveyors are being operated, so that whenever the ends of any wire-bars engage the wheels 165 or 167, the bar will be shifted so as to be aligned with the remaining bars.

When ingots and ingot bars are being handled, the transfer mechanism is not used, the discharge table 121 is removed, and an ingot conveyor 153 is installed in the place of the discharge platform 121. The ingots and ingot bars then drop by gravity from the inspection conveyor A over an inclined chute, not shown, to the inclined ingot conveyor 153. This conveyor is equipped with lifting flights which carry the ingots or ingot bars upwardly and discharge them into large buckets 155 which are set on narrow gauge cars for removal from the casting house.

When cakes are being handled, they are gauged only on the conveyor A and are removed one at a time from the platform 121 using lifting tongs and a jib crane. The cakes are loaded on narrow gauge cars and sent to the inspection table where they are inspected on all sides and prepared for shipment.

In the case of wire-bars, the rejected bars which have been sorted by the transfer mechanism described herein are loaded from the discharge platform 119 on cars separate from the satisfactory bars, and are sent to the inspection table where they are either prepared for shipment or rejected and returned to the furnace for remelting.

The present construction consequently affords a mechanism for handling a variety of cast shapes, such as wire-bars, ingots, or cast cakes of copper or other metal.

What is claimed is:

1. Conveying mechanism for handling cast metal shapes comprising a main conveyor for receiving the shapes, an auxiliary conveyor adjacent to the main conveyor and adapted to receive selected shapes from the main conveyor, and mechanism for transferring selected shapes in any desired variable sequence from the main conveyor to the auxiliary conveyor, the said mechanism including means for engaging selected shapes and moving the said shapes from the main conveyor to the auxiliary conveyor, and retractable stop members operable responsively to actuation of the engaging means for stopping forward movement of the shapes on the main conveyor during transfer operations.

2. Conveying mechanism for handling cast metal shapes comprising a main conveyor for receiving the shapes, an auxiliary conveyor adjacent to the main conveyor and adapted to receive selected shapes from the main conveyor, and mechanism for transferring selected shapes in any desired variable sequence from the main conveyor to the auxiliary conveyor, the said mechanism including means for engaging selected shapes and moving the said shapes from the main conveyor to the auxiliary conveyor, retractable stop members operable responsively to actuation of the engaging means for stopping forward movement of the shapes on the main conveyor during transfer operations, and operating instrumentalities for the stop members interconnecting the said stop members and engaging means.

3. Conveying mechanism for cast metal shapes comprising a main conveyor for receiving the shapes, an auxiliary conveyor adjacent to the main conveyor and adapted to receive selected shapes from the main conveyor, and mechanism for transferring selected shapes in any desired variable sequence from the main conveyor to the auxiliary conveyor, the said mechanism including means for engaging selected shapes and moving the said shapes from the main conveyor to the auxiliary conveyor, retractable stop members operable responsively to actuation of the engaging means for stopping forward movement of the shapes on the main conveyor during transfer operations, and operating instrumentalities for the stop members comprising a plurality of operating links interconnecting the engaging means and stop members, for rotating the stop members between operative and inoperative positions.

4. Conveying mechanism for cast metal shapes comprising a main conveyor for receiving the shapes, an auxiliary conveyor adjacent to the main conveyor and adapted to receive selected shapes from the main conveyor, and mechanism for transferring selected shapes from the main conveyor to the auxiliary conveyor, the said mechanism including means for engaging selected shapes and moving the said shapes from the main conveyor to the auxiliary conveyor, retractable stop members operable responsively to actuation of the engaging means for stopping forward movement of the shapes on the main conveyor during transfer operations, the said stop members comprising rotatably mounted arms, and link devices interconnecting the said arms and the engaging means, the said link devices being actuated upon operation of the said engaging means.

5. Conveyor mechanism for cast metal shapes comprising a main conveyor for receiving the shapes, an auxiliary conveyor adjacent to the main conveyor and adapted to receive selected shapes from the main conveyor, and mechanism for transferring selected shapes from the main conveyor to the auxiliary conveyor, the said mechanism including a reciprocable piston having means thereon for engaging selected shapes and for moving the said shapes from the main conveyor to the auxiliary conveyor, an operating lever operable by the said piston, retractable stop members movable into operating position with respect to the shapes to stop travel of the shapes on the conveyor responsively to operation of the said piston, and lever members interconnecting the said operating lever and stop members, to transfer movement of the operating lever to the said stop members.

6. Conveying mechanism for cast metal shapes comprising a main conveyor for receiving the shapes, an auxiliary conveyor adjacent to the main conveyor and adapted to receive selected shapes from the main conveyor, and mechanism for transferring selected shapes from the main conveyor to the auxiliary conveyor, the said mechanism including a reciprocable piston having means thereon for engaging selected shapes and for moving the said shapes from the main conveyor onto the auxiliary conveyor, an operating lever operable by the said piston, retractable stop members including rotatably mounted stop arms and operating arms therefor for shifting the said stop arms between operative and inoperative positions, and lever members interconnecting the said operating lever and stop members to transfer movement from the operating lever to the said stop members.

7. Conveying mechanism for cast metal shapes comprising a main conveyor for receiving the shapes, an auxiliary conveyor adjacent to the main conveyor and adapted to receive selected shapes from the main conveyor, and mechanism for transferring selected shapes from the main conveyor to the auxiliary conveyor, the said mechanism including a reciprocable piston having means thereon for engaging selected shapes and for moving the said shapes from the main conveyor onto the auxiliary conveyor, an operating lever operable by the said piston, instrumentalities for stopping travel of the shapes on the main conveyor incident to moving the shapes from the main conveyor to the auxiliary conveyor, the said instrumentalities including a plurality of rotatably mounted substantially upstanding abutment members, one of the said abutment members having operatively connected thereto a substantially upstanding operating arm, another of the said abutment members having operatively connected therewith a downwardly extending operating arm, and lever mechanism interconnecting the said arms to the operating lever, whereby movement of the piston is transmitted to the abutment members to shift the latter in opposite directions between operative and inoperative positions.

8. Conveying mechanism for handling copper wire-bars, comprising a main conveyor, means for delivering the wire bars onto the conveyor so that the bars lie transversely across the conveyer, an auxiliary conveyor adjacent to the main conveyor and adapted to receive selected wire-bars from the main conveyor, mechanism operable for transferring in any desired variable sequence selected bars lengthways from the main conveyor to the auxiliary conveyor, said transfer mechanism comprising reciprocable abutment means for engaging the bar selected for transfer, means for stopping forward movement of the selected bar, said stop means being operable by said reciprocable engaging means during initial movement from a normally inactive position toward said main conveyor, and guide means between the conveyors for guiding the movement of the bars from the main conveyor to the auxiliary conveyor.

9. Conveying mechanism for handling copper wire-bars, comprising a main conveyor for receiving the bars cross-ways of the conveyor, an auxiliary conveyor adjacent to the main conveyor and adapted to receive selected bars from the main conveyor, and mechanism comprising a member reciprocable transversely of said main conveyor having abutment means thereon for engaging selected bars to transfer the same lengthways from the main conveyor to the auxiliary conveyor, the said mechanism being operable to transfer the bars in any desired variable sequence, said conveying mechanism comprising means for arresting forward movement of the bars selected for transfer, and said arresting means being operatively connected to said transfer mechanism.

10. Conveying mechanism for handling copper wire-bars, comprising a main conveyor for receiving the bars cross-ways of the conveyor, an auxiliary conveyor adjacent to the main conveyor and substantially parallel thereto, and adapted to receive selected bars from the main conveyor, mechanism operable for engaging in any desired variable sequence selected bars to slide the said bars end-ways from the main conveyor to the auxiliary conveyor, and stop means adjacent to the auxiliary conveyor for stopping endwise movement of the said selected bars during transference to retain the said selected bars on the auxiliary conveyor, and additional stop means for arresting forward movement of said selected bars on said main conveyor during transfer.

11. Conveying mechanism for handling copper wire-bars, comprising a main conveyor for receiving the bars cross-ways of the conveyor, an auxiliary conveyor adjacent to the main conveyor and adapted to receive selected bars from the main conveyor, and mechanism for engaging in any desired variable sequence selected bars to slide the said bars endways from the main conveyor to the auxiliary conveyor, the said mechanism including instrumentalities for arresting forward movement of said selected bars on the main conveyor during transfer of the selected bars.

12. Conveying mechanism for handling copper wire bars, comprising a main conveyor, means for delivering to the said conveyor a heterogeneous sequence of marketable and unmarketable wire bars, the said means delivering the said bars so as to cause them to lie transversely across the conveyor, an auxiliary conveyor adjacent to the main conveyor, and means operable to engage selected bars while supported on said main conveyor and slide the engaged bars lengthways from the main conveyor onto the auxiliary conveyor, thereby obtaining a separation between the marketable and unmarketable bars, said conveying mechanism including means for arresting the forward movement of the bars selected for transfer, and said arresting means being actuated by said bar engaging means.

13. Conveying mechanism for handling copper wire bars, comprising a main conveyor, means for delivering to the said conveyor a heterogeneous sequence of marketable and unmarketable bars, an auxiliary conveyor, and reciprocable means operable to engage the bars in any desired variable sequence while supported on said main conveyor and slide the engaged bars from the main conveyor onto the auxiliary conveyor, for effecting a separation between the marketable and the unmarketable bars, said conveying mechanism including means for arresting the forward movement of the bars selected for transfer, and said arresting means being operable concommitantly with said reciprocable means.

KARL A. LINDNER.
HUGH M. SHEPARD.